(12) United States Patent
Zhang et al.

(10) Patent No.: US 11,927,491 B2
(45) Date of Patent: Mar. 12, 2024

(54) SELF-CALIBRATION DETECTION DEVICE AND TEMPERATURE DEMODULATION METHOD ORIENTED TO FIBER RAMAN TEMPERATURE SENSING SYSTEM

(71) Applicant: TAIYUAN UNIVERSITY OF TECHNOLOGY, Taiyuan (CN)

(72) Inventors: Mingjiang Zhang, Taiyuan (CN); Jian Li, Taiyuan (CN); Jianzhong Zhang, Taiyuan (CN); Lijun Qiao, Taiyuan (CN); Baoqiang Yan, Taiyuan (CN); Yang Xu, Taiyuan (CN); Baoquan Jin, Taiyuan (CN); Dong Wang, Taiyuan (CN); Yu Wang, Taiyuan (CN); Yuncai Wang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 682 days.

(21) Appl. No.: 17/252,992

(22) PCT Filed: May 5, 2019

(86) PCT No.: PCT/CN2019/000086
§ 371 (c)(1),
(2) Date: Dec. 16, 2020

(87) PCT Pub. No.: WO2020/010824
PCT Pub. Date: Jan. 16, 2020

(65) Prior Publication Data
US 2021/0116311 A1     Apr. 22, 2021

(30) Foreign Application Priority Data

Jul. 9, 2018   (CN) .......................... 201810747173.8

(51) Int. Cl.
*G01K 15/00*         (2006.01)
*G01K 11/324*        (2021.01)

(52) U.S. Cl.
CPC .......... *G01K 15/005* (2013.01); *G01K 11/324* (2021.01); *G01K 15/007* (2013.01)

(58) Field of Classification Search
None
See application file for complete search history.

(56) References Cited

U.S. PATENT DOCUMENTS

2011/0231135 A1*   9/2011   Suh ........................ G01K 11/32
                                                                      374/1
2016/0006206 A1    1/2016   Kim et al.
2017/0199088 A1*   7/2017   Therrien ................ G01K 11/32

FOREIGN PATENT DOCUMENTS

CN        101819073 A       9/2010
CN        101852657 A       10/2010
(Continued)

OTHER PUBLICATIONS

CN106404217A, IDS record, translation (Year: 2017).*
(Continued)

*Primary Examiner* — Lina Cordero
(74) *Attorney, Agent, or Firm* — Lando & Anastasi, LLP

(57) ABSTRACT

A self-calibration detection device and a temperature demodulation method oriented to a fiber Raman temperature sensing system. The self-calibration detection device comprises a fiber Raman thermodetector, thermostatic baths, a multi-mode sensing fiber, and a multi-mode reflector. The fiber Raman thermodetector comprises a pulsed laser whose output end is connected to the input end of a WDM. Two output ends of the WDM are respectively connected to input ends of a first and second APDs. Output ends of the first and second APDs are respectively connected to input ends of a first and second LNAs. Output ends of the first and second (Continued)

LNAs are connected to the input end of a data acquisition card whose output end is connected with the input end of a computer. The temperature demodulation method can solve the problems of low temperature measuring accuracy, lower temperature measurement stability and low temperature measurement efficiency.

3 Claims, 1 Drawing Sheet

(56) References Cited

FOREIGN PATENT DOCUMENTS

| CN | 201909810 U | * | 7/2011 |
| CN | 103217232 A | | 7/2013 |
| CN | 103364107 A | | 10/2013 |
| CN | 203298900 U | | 11/2013 |
| CN | 104344913 A | | 2/2015 |
| CN | 104596670 A | * | 5/2015 |
| CN | 105043586 A | | 11/2015 |
| CN | 105806508 A | | 7/2016 |
| CN | 106323500 A | | 1/2017 |
| CN | 106404217 A | | 2/2017 |
| CN | 106813805 A | * | 6/2017 |
| CN | 107843357 A | | 3/2018 |
| CN | 108458814 A | | 8/2018 |
| EP | 2944933 A1 | | 11/2015 |
| WO | 2020010824 A1 | | 1/2020 |

OTHER PUBLICATIONS

CN103364107A, IDS record, translation (Year: 2013).*
CN201909810U, translation (Year: 2011).*
CN104596670A, translation (Year: 2015).*
CN106813805A, translation (Year: 2017).*
International Search Report and Written Opinion from corresponding International Application No. PCT/CN2019/000086 dated Jul. 26, 2019.
Search Report from Chinese Application No. 201810747173.8 dated Jun. 13, 2019 (no English translation available).

* cited by examiner

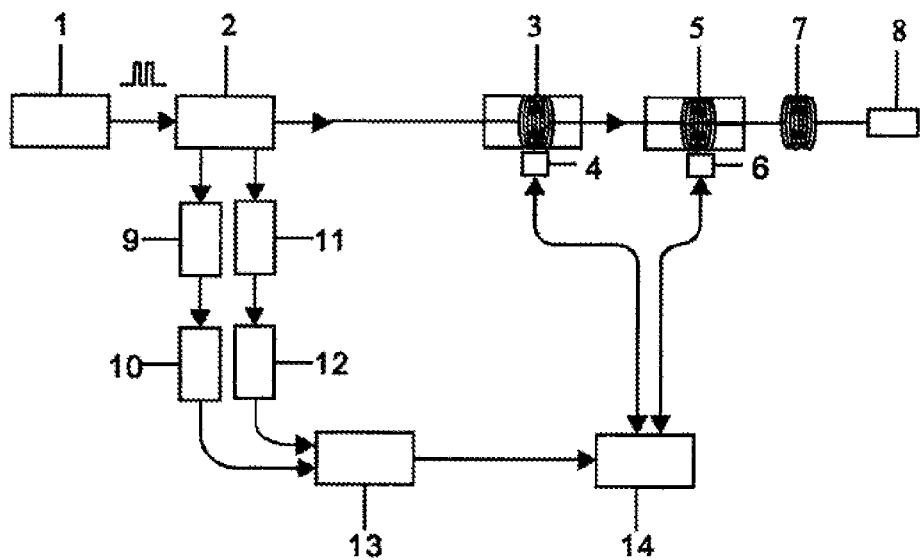

SELF-CALIBRATION DETECTION DEVICE AND TEMPERATURE DEMODULATION METHOD ORIENTED TO FIBER RAMAN TEMPERATURE SENSING SYSTEM

CROSS-REFERENCE TO RELATED APPLICATIONS

This application is a U.S. National Stage Application under 35 U.S.C. § 371 of International Application No. PCT/CN2019/000086, filed May 5, 2019, titled SELF-CALIBRATION DETECTION DEVICE AND TEMPERATURE DEMODULATION METHOD ORIENTED TO FIBER RAMAN TEMPERATURE SENSING SYSTEM, which claims priority to Chinese Application No. 201810747173.8, filed Jul. 9, 2018. International Application No. PCT/CN2019/000086 is incorporated by reference herein in its entirety.

TECHNICAL FIELD OF THE DISCLOSURE

The present disclosure relates to the field of temperature demodulation in a distributed fiber sensing system, and in particular, to a self-calibration temperature detection device and a temperature demodulation method oriented to a fiber Raman sensing system.

BACKGROUND

The distributed fiber sensing technology uses a fiber itself as both a signal transmission medium and a sensing unit to obtain the external physical quantity distribution of the entire fiber link. The distributed fiber sensing system has a high measurement precision, a long sensing distance, and a good reliability, and it has been widely used now in the health monitoring of infrastructure such as an intelligent power grid.

In the distributed fiber Raman temperature measurement system, a current commonly used method of temperature demodulation is to use Stokes backscattering light as a reference channel and anti-Stokes backscattering light as a signal channel, and then to use a light intensity ratio of the two backscattering light to demodulate the temperature information along the fiber. However, practice shows that the existing temperature demodulation method is limited by its own principle, thus is objected to for the following problems: firstly, since the Stokes light and the anti-Stokes light have different wavelengths and different propagation speeds in the fiber, the times that the Stokes light and the anti-Stokes light scattered from the same position arrive at a data acquisition card are different, and the Stokes light and the anti Stokes light acquired by the data acquisition card at the same time are not from the same position, which renders signal dislocation and accordingly renders the temperature measurement precision and temperature measurement stability of the system low; secondly, in the existing temperature demodulation method, a whole fiber to be tested must be carried out using a calibration processing at a constant temperature before temperature measurement (if the fiber to be tested is replaced, the laser power is adjusted or any device of the system is replaced, then the calibration processing must be carried out again), which renders tedious operation and accordingly renders temperature measurement efficiency of the system low; thirdly, since a Raman signal is weak, the system uses a high-gain APD as a device for receiving the Raman signal, however, the gain of APD is objected to a greater influence along with the change of temperature, and since the existing demodulation method considers the influence of APD gain on temperature measurement results, it finally leads to the low temperature measurement precision and low temperature measurement stability of the system; fourthly, in the process of engineering application of Raman temperature measurement system, the laying of sensing fiber will cause the fiber to be bent or deformed in a greater degree, and this phenomenon will also greatly affect the temperature measurement precision and stability of the system.

Based on the above-mentioned content, it is necessary to invent a new temperature demodulation method to solve the problems of low temperature measurement precision and low temperature measurement stability of the existing distributed fiber sensing system and the calibration processing needed in an earlier stage due to fiber dispersion, inconsistent APD photoelectric response, fiber mutation loss, and the earlier-stage calibration processing of the system.

SUMMARY

In order to solve the problem that the system temperature measurement precision of the existing distributed fiber Raman sensing system drops sharply due to the fiber dispersion, APD temperature drift and fiber mutation bending etc., the present disclosure provides a self-calibration detection device and a temperature demodulation method oriented to a distributed fiber Raman temperature sensing system.

The present disclosure is realized by following technical solutions:

The present disclosure provides a self-calibration detection device oriented to a fiber Raman temperature sensing system comprising a fiber Raman thermodetector, thermostatic baths, a multi-mode sensing fiber, and a multi-mode reflector.

The fiber Raman thermodetector includes a pulsed laser, a WDM (Wavelength Division Multiplexer), two APDs (Avalanche Photodiode), two LNAs (Low-Noise Amplifier), a data acquisition card, and a computer; wherein an output end of the pulsed laser is connected to an input end of the WDM; two output ends of the WDM are respectively connected to input ends of the first APD and the second APD; an output end of the first APD is connected to an input end of the first LNA; an output end of the second APD is connected to an input end of the second LNA; output ends of the first LNA and the second LNA are connected to an input end of the data acquisition card; and an output end of the data acquisition card is connected to an input end of the computer.

An input end of the multi-mode sensing fiber is connected to a common end of the WDM, wherein a middle part of the multi-mode sensing fiber is respectively wound with a first reference fiber ring and a second reference fiber ring, and a rear part of the multi-mode sensing fiber is used as a sensing fiber to be tested; the first reference fiber ring is placed in a first temperature bath, and the second reference fiber ring is placed in a second temperature bath; wherein an output end of the sensing fiber to be tested is connected to the multi-mode fiber reflector.

The present disclosure provides a temperature demodulation method oriented to a fiber Raman temperature sensing system, comprising following steps:

Step 1, constructing the above-mentioned self-calibration temperature detection device oriented to a fiber Raman sensing system.

Step 2, performing an interpolation processing on Stokes light for chromatic dispersion compensation.

Setting a temperature value of the first temperature bath as $T_c$; setting a temperature value of the second temperature bath as $T_2$; then, starting the fiber Raman thermodetector, and transmitting laser pulses emitted by the pulsed laser to the first reference fiber ring, the second reference fiber ring, the sensing fiber to be tested and the multi-mode reflector via the WDM; conducting spontaneous Raman scattering when the laser pulse propagates in the multi-mode sensing fiber, such that Stokes light and anti-Stokes light are generated at each position of the multi-mode sensing fiber; wherein backward Stokes light and anti-Stokes light generated in the fiber firstly respectively arrive at the first APD, the first LNA, the second APD, and the second LNA via the WDM and are performed a photoelectric conversion and amplification, finally, enter the high-speed acquisition card and the computer to acquire data and obtain positional and light intensity information of the Stokes light and anti-Stokes light along the fiber.

According to positions in a light intensity curve of the Stokes light and the anti-Stokes light from the first reference fiber ring and the second reference fiber ring, performing an interpolation processing on all of the Stokes light along the fiber to render the times when the Stokes light and the anti-Stokes light generated at the same position of the multi-mode sensing fiber arrive at the data acquisition card to be the same.

Specific steps of interpolation processing are as follows:

Setting positions of the Stokes light and the anti-Stokes light generated at a position of the first reference fiber ring detected by the acquisition card as $L_{s1}$ and $L_{a1}$; setting positions of the Stokes light and the anti-Stokes light generated at a position of the second reference fiber ring as $L_{s2}$ and $L_{a2}$; and setting $\emptyset_s(L)$ as $$\phi_s(L) = \phi_s\left(\frac{L_{s1}-L_{s2}}{L_{s1}-L_{a2}}L + L_{s1} - L_{a2}\frac{L_{s1}-L_{s2}}{L_{a1}-L_{s2}}\right),$$

where $\emptyset_s(L)$ represents a value of light intensity of the Stokes light generated at a certain position of the multi-mode sensing fiber; L represents a distance between the position and a front end of the multi-mode sensing fiber.

Step 3, processing signals about backward Stokes light and anti-Stokes light.

The data acquisition card obtains a backscattering light intensity curve of the anti-Stokes light and Stokes light, whose light intensity ratio is expressed as:

$$\frac{\phi_a}{\phi_s} = \frac{K_a V_a^4}{K_s V_s^4} F_T \exp\left(-\frac{h\Delta v}{kT}\right)\exp[(\alpha_s - \alpha_a)l], \qquad (1)$$

where $K_s$ and $K_a$ are coefficients related to a scattering end cross section of the fiber; $V_s$ and $V_a$ are frequencies of the Stokes light and anti-Stokes light; $F_T$ is a photoelectric conversion factor of the APD; h and K are Planck Constant and Boltzmann Constant respectively; $\Delta_v$ is a Raman frequency offset of the fiber, which is 13.2 THz; $a_s$ and $a_a$ are attenuation coefficients of incident Stokes light and anti-Stokes light per unit length of the fiber, respectively; T represents a temperature value at a position 1 of the sensing fiber to be tested; 1 represents a distance between the position and the front end of the multi-mode sensing fiber.

A backscattering light intensity ratio of the anti-Stokes light and the Stokes light at a position of the first reference fiber ring is expressed as:

$$\frac{\phi_{ac}}{\phi_{sc}} = \frac{K_a V_a^4}{K_s V_s^4} F_T \exp\left(-\frac{h\Delta v}{kT_c}\right)\exp[(\alpha_s - \alpha_a)l_c], \qquad (2)$$

where $T_c$ represents a temperature value at a position $l_c$ of the first reference fiber ring; $l_c$ represents a distance between the position and the front end of the multi-mode sensing fiber; and a ratio of formula (1) and formula (2) is:

$$A = \frac{\phi_a/\phi_s}{\phi_{ac}/\phi_{sc}} = \exp\left[-\frac{h\Delta v}{k}\left(\frac{1}{T}-\frac{1}{T_c}\right)\right]\exp[(\alpha_s - \alpha_a)(l-l_c)]. \qquad (3)$$

Step 4, processing signals about forward Stokes light and anti-Stokes light.

The forward Stokes light and anti-Stokes light generated in the fiber are reflected by the multi-mode reflector and respectively arrive at the first APD, the first LNA, and the second APD, the second LNA again via the WDM, and are also performed the photoelectric conversion and amplification, then enter the high-speed acquisition card and the computer to obtain a forward scattering light intensity curve of the anti-Stokes light and the Stokes light, whose light intensity ratio is expressed as:

$$\frac{\phi_{af}}{\phi_{sf}} = \frac{K_a V_a^4}{K_s V_s^4} F_T \frac{R_a}{R_s}\exp\left(-\frac{h\Delta v}{kT}\right)\exp[(\alpha_s - \alpha_a)(2L-l)], \qquad (4)$$

where $R_a$ and $R_s$ are reflectivity of the multi-mode reflector to the anti-Stokes light and the Stokes light, and L is a length of the entire multi-mode sensing fiber.

A forward scattering light intensity ratio of the anti-Stokes light and the Stokes light at a position of the first reference fiber ring is expressed as:

$$\frac{\phi_{afc}}{\phi_{sfc}} = \frac{K_a V_a^4}{K_s V_s^4} F_T \frac{R_a}{R_s} exp\left(-\frac{h\Delta v}{kT_c}\right)\exp[(\alpha_s - \alpha_a)(2L-l_c)]. \qquad (5)$$

A ratio of formula (4) and formula (5) is:

$$B = \frac{\phi_{af}/\phi_{sf}}{\phi_{afc}/\phi_{sfc}} = \exp\left[-\frac{h\Delta v}{k}\left(\frac{1}{T}-\frac{1}{T_c}\right)\right]\exp[(\alpha_s - \alpha_a)(l_c-l)]. \qquad (6)$$

Step 5: self-calibration temperature demodulation method oriented to fiber Raman sensing system.

After resolving formulas (3) and (6), a formula as follows may be obtained:

$$\sqrt{AB} = \frac{\phi_a/\phi_s}{\phi_{ac}/\phi_{sc}}\frac{\phi_{af}/\phi_{sf}}{\phi_{afc}/\phi_{sfc}} = \exp\left[-\frac{h\Delta v}{k}\left(\frac{1}{T}-\frac{1}{T_c}\right)\right]. \qquad (7)$$

A specific temperature demodulation formula along the fiber as follows may be obtained after resolving formula (7):

$$T = \left[\ln\left(\frac{\phi_a/\phi_s}{\phi_{ac}/\phi_{sc}} \frac{\phi_{af}/\phi_{sf}}{\phi_{afc}/\phi_{sfc}}\right)\left(-\frac{k}{h\Delta v}\right) + \frac{1}{T_c}\right]^{-1}. \quad (8)$$

Compared with existing distributed fiber sensing systems, the self-calibration temperature detection device and the temperature demodulation method oriented to a fiber Raman sensing system of the present disclosure have the following advantages:

First, the present disclosure uses the positional information of scattering signals generated at two sections of reference fiber ring to perform interpolation for the positions of the Stokes light, enabling the acquisition card to receive the light intensity information of the Stokes light and the anti-Stokes light generated at the same position at the same time, thereby avoiding the influence of fiber dispersion on the temperature measurement precision and temperature measurement stability.

Second, the present disclosure inventively uses the backward and forward Raman scattering light to demodulate the temperature along the fiber, thereby avoiding the influence of the bending of the fiber on the temperature measurement precision and temperature measurement stability in the measurement stage.

Third, the present disclosure does not need to perform the calibration processing before temperature measurement, thereby speeding up a more convenient industrialization process of the distributed fiber sensing system.

The present disclosure has a reasonable design, and effectively solves the problems of low temperature measurement precision, lower temperature measurement stability and low temperature measurement efficiency caused by temperature demodulation methods in the existing distributed fiber Raman temperature measurement systems, thus it is suitable for the distributed fiber Raman temperature measurement systems.

BRIEF DESCRIPTION OF THE DRAWINGS

FIG. 1 shows a schematic diagram of a self-calibration temperature detection device oriented to a fiber Raman sensing system of the present disclosure.

1-pulse laser; 2-WDM (wavelength division multiplexer 1550 nm/1450 nm/1650 nm); 3-first reference fiber ring; 4-first thermostatic bath; 5-second reference fiber ring; 6-second thermostatic bath; 7-sensing fiber to be tested; 8-multi-mode reflector; 9-first APD; 10-first LNA; 11-second APD; 12-second LNA; 13-high-speed data acquisition card; 14-computer.

DETAILED DESCRIPTION

The embodiments of the present disclosure will be described in detail below with reference to the drawings.

A temperature demodulation method oriented to a fiber Raman sensing system is implemented by a following self-calibration temperature detection device. The device includes a 1550 nm pulsed laser, a wavelength division multiplexer (WDM), two avalanche photodiodes (APD), two low-noise amplifiers (LNA), a multi-mode sensing fiber (ordinary multi-mode fiber), a data acquisition card, a computer, two sections of reference fiber ring, two thermostatic baths (for placing the first reference fiber ring and the second reference fiber ring), and a multi-mode fiber reflector.

The temperature demodulation method oriented to a fiber Raman sensing system is divided into four steps:

Step 1, constructing a self-calibration temperature detection device oriented to a fiber Raman sensing system.

The self-calibration temperature detection device oriented to a fiber Raman sensing system includes a fiber Raman thermodetector, reference fiber rings, thermostatic baths, a multi-mode sensing fiber, and a multi-mode reflector.

As shown in FIG. 1, the fiber Raman thermodetector includes a pulsed laser, a WDM, two APDs, two LNAs, a data acquisition card, and a computer; wherein an output end of the pulsed laser 1 is connected to an input end of the WDM 2; two output ends of the WDM 2 are respectively connected to input ends of the first APD 9 and the second APD 11; an output end of the first APD 9 is connected to an input end of the first LNA 10; an output end of the second APD 11 is connected to an input end of the second LNA 12; output ends of the first LNA 10 and the second LNA 12 are connected to an input end of the data acquisition card 13; an output end of the data acquisition card 13 is connected to an input end of the computer 14.

An input end of the multi-mode sensing fiber is connected to a common end of the WDM 2, wherein a middle part of the multi-mode sensing fiber is respectively wound with a first reference fiber ring 3 and a second reference fiber ring 5, and a rear part is used as a sensing fiber to be tested 7; the first reference fiber ring 3 is placed in a first temperature bath 4, and the second reference fiber ring 5 is placed in a second temperature bath 6; wherein an output end of the first reference fiber ring 3 is connected to an incident end of the second reference fiber ring 5, an output end of the second reference fiber ring 5 is connected to an incident end of the sensing fiber to be tested 7, and an output end of the sensing fiber to be tested 7 is connected to a multi-mode fiber reflector 8.

Step 2, performing an interpolation processing on Stokes light for chromatic dispersion compensation.

Setting a temperature value of the first temperature bath as $T_c$; setting a temperature value of the second temperature bath as $T_2$; then starting the fiber Raman thermodetector, and transmitting laser pulses emitted by the pulsed laser to the first reference fiber ring, the second reference fiber ring, the sensing fiber to be tested and the multi-mode reflector via the WDM; conducting spontaneous Raman scattering when the laser pulses propagate in the multi-mode sensing fiber, thereby generating Stokes light and anti-Stokes light at each position of the multi-mode sensing fiber.

The Stokes light is incident on the data acquisition card successively via the WDM, the first APD, and the first LNA, and the data acquisition card performs an analog-digital conversion on the Stokes light, thereby obtaining a light intensity curve of the Stokes light.

The anti-Stokes light is successively incident on the data acquisition card successively via the WDM, the second APD, and the second LNA, and the data acquisition card performs an analog-digital conversion on the anti-Stokes light, thereby obtaining a light intensity curve of the anti-Stokes light.

The data acquisition card and the computer detect positional information of the Stokes light and anti-Stokes light from the first reference fiber ring and the second reference fiber ring, and perform an interpolation processing on positions of the Stokes light by using the propagation speed of Stokes light and anti-Stokes light in the fiber, such that the times when the Stokes light and the anti-Stokes light generated at the same position of the multi-mode sensing fiber arrive at the data acquisition card are the same.

Specific steps of interpolation processing are as follows:

Setting the positions of the Stokes light and the anti-Stokes light generated at a position of the first reference fiber ring detected by the data acquisition card as $L_{s1}$ and $L_{a1}$, setting the positions of the Stokes light and the anti-Stokes light generated at a position of the second reference fiber ring as $L_{s2}$ and $L_{a2}$ and setting $\emptyset_s(L)$ as $$\phi_s(L) = \phi_s \left( \frac{L_{s1} - L_{s2}}{L_{a1} - L_{a2}} L + L_{s1} - L_{a2} \frac{L_{s1} - L_{s2}}{L_{a1} - L_{a2}} \right),$$

where $\emptyset_s(L)$ represents a value of light intensity of the Stokes light generated at a certain position of the multi-mode sensing fiber; and L represents a distance between the position and a front end of the multi-mode sensing fiber.

Step 3, processing signals about backward Stokes light and anti-Stokes light.

The data acquisition card and the computer perform a data processing on acquired light intensity data of the backward Stokes light and anti-Stokes light.

The data acquisition card obtains a backscattering light intensity curve of the anti-Stokes light and the Stokes light, and the light intensity ratio thereof may be expressed as:

$$\frac{\phi_a}{\phi_s} = \frac{K_a V_a^4}{K_s V_s^4} F_T \exp\left(-\frac{h\Delta v}{kT}\right) \exp[(\alpha_s - \alpha_a)l], \quad (1)$$

where $K_s$ and $K_a$ are coefficients related to a scattering end cross section of the fiber; $V_s$ and $V_a$ are frequencies of the Stokes light and anti-Stokes light; $F_T$ is a photoelectric conversion factor of the APD; h, K are Planck Constant and Boltzmann Constant respectively; $\Delta_v$ is a Raman frequency offset of the fiber, which is 13.2 THz; $a_s$ and $a_a$ are attenuation coefficients of incident Stokes light and anti-Stokes light per unit length of the fiber, respectively; T represents a temperature value at a position l of the sensing fiber to be tested; and l represents a distance between the position and the front end of the multi-mode sensing fiber;

wherein a backscattering light intensity ratio of the anti-Stokes light and the Stokes light at a position of the first reference fiber ring may be expressed as:

$$\frac{\phi_{ac}}{\phi_{sc}} = \frac{K_a V_a^4}{K_s V_s^4} F_T \exp\left(-\frac{h\Delta v}{kT_c}\right) \exp[(\alpha_s - \alpha_a)l_c], \quad (2)$$

where $T_c$ represents a temperature value at a position of the first reference fiber ring; and $l_c$ represents a distance between the position and the front end of the multi-mode sensing fiber; and a ratio of formula (1) and formula (2) is:

$$A = \frac{\phi_a/\phi_s}{\phi_{ac}/\phi_{sc}} = \exp\left[-\frac{h\Delta v}{k}\left(\frac{1}{T} - \frac{1}{T_c}\right)\right] \exp[(\alpha_s - \alpha_a)(l - l_c)]. \quad (3)$$

Step 4, processing signals about forward Stokes light and anti-Stokes light.

Then forward Stokes light and anti-Stokes light generated in the fiber are reflected by the multi-mode reflector, and respectively arrive at the first APD, the first LNA, and the second APD, the second LNA again via the WDM, and are performed the photoelectric conversion and amplification, and enter the high-speed acquisition card and the computer to obtain a forward scattering light intensity curve of the anti-Stokes light and the Stokes light, whose light intensity ratio may be expressed as:

$$\frac{\phi_{af}}{\phi_{sf}} = \frac{K_a V_a^4}{K_s V_s^4} F_T \frac{R_a}{R_s} \exp\left(-\frac{h\Delta v}{kT}\right) \exp[(\alpha_s - \alpha_a)(2L - l)], \quad (4)$$

where $R_a$ and $R_s$ respectively are reflectivities of the multi-mode reflector to the anti-Stokes light and the Stokes light, and L is a length of the entire multi-mode sensing fiber;

wherein a forward scattering light intensity ratio of the anti-Stokes light and the Stokes light at a position of the first reference fiber ring may be expressed as:

$$\frac{\phi_{afc}}{\phi_{sfc}} = \frac{K_a V_a^4}{K_s V_s^4} F_T \frac{R_a}{R_s} \exp\left(-\frac{h\Delta v}{kT_c}\right) \exp[(\alpha_s - \alpha_a)(2L - l_c)]. \quad (5)$$

A ratio of formula (4) and formula (5) is:

$$B = \frac{\phi_{af}/\phi_{sf}}{\phi_{afc}/\phi_{sfc}} = \exp\left[-\frac{h\Delta v}{k}\left(\frac{1}{T} - \frac{1}{T_c}\right)\right] \exp[(\alpha_s - \alpha_a)(l_c - l)]. \quad (6)$$

Step 5, self-calibration temperature demodulation method oriented to fiber Raman sensing system.

The fiber Raman thermodetector demodulates the temperature data distributed along the fiber according to the light intensity data of the forward and backward Stokes light and anti-Stokes light of the sensing fiber.

After resolving formulas (3) and (6), a formula as follows may be obtained:

$$\sqrt{AB} = \sqrt{\frac{\phi_a/\phi_s}{\phi_{ac}/\phi_{sc}} \frac{\phi_{af}/\phi_{sf}}{\phi_{afc}/\phi_{sfc}}} = \exp\left[-\frac{h\Delta v}{k}\left(\frac{1}{T} - \frac{1}{T_c}\right)\right]. \quad (7)$$

A specific temperature demodulation formula along the fiber, as follows, may be obtained after resolving formula (7):

$$T = \left[\ln\left(\frac{\phi_a/\phi_s}{\phi_{ac}/\phi_{sc}} \frac{\phi_{af}/\phi_{sf}}{\phi_{afc}/\phi_{sfc}}\right)\left(-\frac{k}{h\Delta v}\right) + \frac{1}{T_c}\right]^{-1}. \quad (8)$$

In implementing, the pulsed laser has a wavelength of 1550 nm, a pulse width of 10 ns, and a repetition frequency of 8 KHz. An operating wavelength of the WDM is 1550 nm/1450 nm/1663 nm. The APD has a bandwidth of 100 MHz, and a spectral response range of 900-1700 nm. A bandwidth of the LNA is 100 MHz. The data acquisition card has four channels, a sampling rate of 100 M/s, and a bandwidth of 100 MHz. The multi-mode sensing fiber is an ordinary multi-mode fiber.

Finally, it should be noted that the above embodiments are only used to illustrate the technical solutions of the present disclosure rather than limiting, and although detailed descriptions have been made with reference to the embodiments of the present disclosure, it should be understood for those skilled of the art that modifications or equivalent replacements to the technical solutions of the present disclosure do not depart from the spirit and scope of the technical solutions of the present disclosure, and should be covered by the scope of the claims of the present disclosure.

What is claimed is:

1. A self-calibration detection device oriented to a fiber Raman temperature sensing system, the self-calibration detection device comprising a fiber Raman thermodetector, thermostatic baths, a multi-mode sensing fiber, and a multi-mode fiber reflector;
   wherein the fiber Raman thermodetector includes a pulsed laser, a wavelength division multiplexer (WDM), two avalanche photodiodes (APDs), two low-noise amplifiers (LNAs), a data acquisition card, and a computer;
   wherein an output end of the pulsed laser is connected to an input end of the WDM; two output ends of the WDM are respectively connected to input ends of a first APD and a second APD; an output end of the first APD is connected to an input end of a first LNA; an output end of the second APD is connected to an input end of a second LNA; output ends of the first LNA and the second LNA are connected with input ends of the data acquisition card; and an output end of the data acquisition card is connected to an input end of the computer;
   wherein an input end of the multi-mode sensing fiber is connected to a common end of the WDM, wherein a middle part of the multi-mode sensing fiber is respectively wound with a first reference fiber ring and a second reference fiber ring, and a rear part is used as a sensing fiber to be tested; the first reference fiber ring is placed in a first temperature bath, and the second reference fiber ring is placed in a second temperature bath; and wherein an output end of the sensing fiber to be tested is connected to the multi-mode fiber reflector.

2. A temperature demodulation method oriented to a fiber Raman temperature sensing system, the temperature demodulation method comprising:
   Step 1: constructing a self-calibration temperature detection device oriented to the fiber Raman temperature sensing system comprising a fiber Raman thermodetector, thermostatic baths, a multi-mode sensing fiber, and a multi-mode fiber reflector;
   wherein the fiber Raman thermodetector includes a pulsed laser, a wavelength division multiplexer (WDM), two avalanche photodiodes (APDs), two low-noise amplifiers (LNAs), a data acquisition card, and a computer;
   wherein an output end of the pulsed laser is connected to an input end of the WDM; two output ends of the WDM are respectively connected to input ends of a first APD and a second APD; an output end of the first APD is connected to an input end of a first LNA; an output end of the second APD is connected to an input end of a second LNA; output ends of the first LNA and the second LNA are connected with input ends of the data acquisition card; and an output end of the data acquisition card is connected to an input end of the computer;
   wherein an input end of the multi-mode sensing fiber is connected to a common end of the WDM, wherein a middle part of the multi-mode sensing fiber is respectively wound with a first reference fiber ring and a second reference fiber ring, and a rear part is used as a sensing fiber to be tested; the first reference fiber ring is placed in a first temperature bath, and the second reference fiber ring is placed in a second temperature bath; and wherein an output end of the sensing fiber to be tested is connected to the multi-mode fiber reflector;

Step 2: performing an interpolation processing on Stokes light for chromatic dispersion compensation by:
   setting a temperature value of the first temperature bath as $T_c$;
   setting a temperature value of the second temperature bath as $T_2$;
   starting the fiber Raman thermodetector, and transmitting laser pulses emitted by the pulsed laser to the first reference fiber ring, the second reference fiber ring, the sensing fiber to be tested and the multi-mode fiber reflector via the WDM;
   conducting spontaneous Raman scattering when the laser pulses propagate in the multi-mode sensing fiber, thereby enabling the Stokes light and anti-Stokes light to be generated at each position of the multi-mode sensing fiber;
   wherein backward Stokes light and the anti-Stokes light generated in the multi-mode sensing fiber respectively arrive at the first APD, the first LNA, and the second APD, the second LNA via the WDM;
   performing a photoelectric conversion and amplification on the backward Stokes light and the anti-Stokes light;
   acquiring data and obtaining positional and light intensity information of the Stokes light and the anti-Stokes light along the multi-mode sensing fiber using the data acquisition card and the computer; and
   according to positions in a light intensity curve of the Stokes light and the anti-Stokes light of the first reference fiber ring and the second reference fiber ring, performing the interpolation processing on the Stokes light along the multi-mode sensing fiber to enable times when the Stokes light and the anti-Stokes light generated at a same position of the multi-mode sensing fiber arrive at the data acquisition card are the same;
   wherein steps of the interpolation processing are:
   setting positions of the Stokes light and the anti-Stokes light generated at a position of the first reference fiber ring detected by the data acquisition card as $L_{s1}$ and $L_{a1}$;
   setting positions of the Stokes light and the anti-Stokes light generated at a position of the second reference fiber ring as $L_{a2}$ and $L_{a2}$; and
   setting $\varphi_s$ (L) as $$\phi_s(L) = \phi_s\left(\frac{L_{s1} - L_{s2}}{L_{a1} - L_{a2}}L + L_{s1} - L_{a1}\frac{L_{s1} - L_{s2}}{L_{a1} - L_{a2}}\right),$$

where $\varphi_s$ (L) represents a value of light intensity of the Stokes light generated at a position of the multi-mode sensing fiber, and L represents a distance between the position and a front end of the multi-mode sensing fiber;
   Step 3: processing signals about the backward Stokes light and the anti-Stokes light by:
   obtaining, by the data acquisition card, a backscattering light intensity curve of the anti-Stokes light and the Stokes light, whose light intensity ratio is represented as:

$$\frac{\phi_a}{\phi_s} = \frac{K_a V_a^4}{K_s V_s^4} F_T \exp\left(-\frac{h\Delta v}{kT}\right) \exp[(\alpha_s - \alpha_a)l], \qquad (1)$$

where $K_s$ and $K_a$ are coefficients related to a scattering end cross section of the multi-mode sensing fiber; $V_s$ and $V_a$ are frequencies of the Stokes light and the anti-Stokes light; $F_T$ is a photoelectric conversion factor of the two APDs; h and K are Planck Constant and Boltzmann Constant respectively; $\Delta_v$ is a Raman frequency offset of the multi-mode sensing fiber, which is 13.2 Terahertz (THz); $a_s$ and $a_a$ are attenuation coefficients of incident Stokes light and incident anti-Stokes light per unit length of the multi-mode sensing fiber, respectively; T represents a temperature value at a position 1 of the sensing fiber to be tested; and 1 represents the distance between the position and the front end of the multi-mode sensing fiber;

wherein a backscattering light intensity ratio of the anti-Stokes light and the Stokes light at the position of the first reference fiber ring is expressed as:

$$\frac{\phi_{ac}}{\phi_{sc}} = \frac{K_a V_a^4}{K_s V_s^4} F_T \exp\left(-\frac{h\Delta v}{kT_c}\right) \exp[(\alpha_s - \alpha_a)l_c], \quad (2)$$

where $T_c$ represents a temperature value at a position $l_c$ of the first reference fiber ring; and $l_c$ represents the distance between the position and the front end of the multi-mode sensing fiber; and a ratio of formula (1) and formula (2) is:

$$A = \frac{\phi_a/\phi_s}{\phi_{ac}/\phi_{sc}} = \exp\left[-\frac{h\Delta v}{k}\left(\frac{1}{T} - \frac{1}{T_c}\right)\right] \exp[(\alpha_s - \alpha_a)(l - l_c)]; \quad (3)$$

Step 4: processing signals about forward Stokes light and the anti-Stokes light by:

reflecting the forward Stokes light and the anti-Stokes light generated in the multi-mode sensing fiber by the multi-mode reflector and respectively arriving at the first APD, the first LNA, and the second APD, the second LNA again via the WDM;

performing the photoelectric conversion and amplification;

obtaining, using the data acquisition card and the computer, a forward scattering light intensity curve of the anti-Stokes light and the Stokes light, whose light intensity ratio is expressed as:

$$\frac{\phi_{af}}{\phi_{sf}} = \frac{K_a V_a^4}{K_s V_s^4} F_T \frac{R_a}{R_s} \exp\left(-\frac{h\Delta v}{kT}\right) \exp[(\alpha_s - \alpha_a)(2L - l)], \quad (4)$$

where $R_a$ and $R_s$ are reflectivities of the multi-mode reflector to the anti-Stokes light and the Stokes light, and L is a length of the multi-mode sensing fiber;

wherein a forward scattering light intensity ratio of the anti-Stokes light and the Stokes light at the position of the first reference fiber ring is expressed as:

$$\frac{\phi_{afc}}{\phi_{sfc}} = \frac{K_a V_a^4}{K_s V_s^4} F_T \frac{R_a}{R_s} \exp\left(-\frac{h\Delta v}{kT_c}\right) \exp[(\alpha_s - \alpha_a)(2L - l_c)]; \quad (5)$$

and a ratio of formula (4) and formula (5) is:

$$B = \frac{\phi_{af}/\phi_{sf}}{\phi_{afc}/\phi_{sfc}} = \exp\left[-\frac{h\Delta v}{k}\left(\frac{1}{T} - \frac{1}{T_c}\right)\right] \exp[(\alpha_s - \alpha_a)(l_c - l)]; \quad (6)$$

Step 5: performing a self-calibration temperature demodulation method oriented to the fiber Raman temperature sensing system by:

obtaining a formula as follows after resolving formulas (3) and (6):

$$B = \frac{\phi_{af}/\phi_{sf}}{\phi_{afc}/\phi_{sfc}} = \exp\left[-\frac{h\Delta v}{k}\left(\frac{1}{T} - \frac{1}{T_c}\right)\right] \exp[(\alpha_s - \alpha_a)(l_c - l)]; \quad (6)$$

after resolving formula (7), obtaining a specific temperature demodulation formula along the multi-mode sensing fiber:

$$\sqrt{AB} = \frac{\phi_a/\phi_s}{\phi_{ac}/\phi_{sc}} \frac{\phi_{af}/\phi_{sf}}{\phi_{afc}/\phi_{sfc}} = \exp\left[-\frac{h\Delta v}{k}\left(\frac{1}{T} - \frac{1}{T_c}\right)\right], \quad (7)$$

3. The temperature demodulation method for the self-calibration temperature detection device oriented to the fiber Raman temperature sensing system of claim 2, characterized in that:

the pulsed laser has a wavelength of 1550 nanometers (nm), a pulse width of 10 nanoseconds (ns), and a repetition frequency of 8 kilohertz (kHz);

an operating wavelength of the WDM is 1550 nm/1450 nm/1663 nm;

the two APDs have a bandwidth of 100 megahertz (MHz) and a spectral response range of 900-1700 nm;

a bandwidth of the two LNAs is 100 MHz;

the data acquisition card has 4 channels, a sampling rate of 100 mega samples per second (MS/s), and a bandwidth of 100 MHz; and the multi-mode sensing fiber is an ordinary multi-mode fiber.

* * * * *